Patented Aug. 18, 1931

1,819,957

UNITED STATES PATENT OFFICE

ADOLF KREBSER AND ERNST WYSARD, OF BASEL, SWITZERLAND, ASSIGNORS TO "J. R. GEIGY S. A.", OF BASEL, SWITZERLAND

MANUFACTURE OF OIL AND FAT SOLUBLE AZO DYESTUFFS

No Drawing. Application filed November 23, 1928, Serial No. 321,514, and in Germany December 3, 1927.

An ordinary oil and fat soluble azo dyestuff, such for example as meta-toluidine coupled with β-naphthol, when dissolved by grinding with boiled linseed oil varnish and rolled upon paper, gives in lithographic works weak prints which dry up very slowly and dully and considerably wet through paper. Additions of known drying substances, such as lead, manganese and cobalt compounds shorten the time of drying somewhat. From systematic research on oil soluble dyestuffs it has now surprisingly been found that the solubility of ordinary fat dyestuffs in fat oils, as for example linseed oil varnish, is greatly improved and thereby the drying property greatly increased in lithographic print works if two molecules of a fat dyestuff of the above mentioned kind are united together by means of a CH.R-group, in which R represents hydrogen or a simple or substituted aryl radical.

Thus for example the dyestuff from the diamino base of a benzaldehyde and meta-toluidine or para-xylidine, when tetrazotized and coupled with β-naphthol, is very easily soluble in linseed oil, and the rolled up fat oil solution has the property of well and rapidly drying up in lithographic print, as well as that of not blotting or wetting through, whilst rather giving a bright color. The use of catalytic accelerators for the oxidation is completely unnecessary.

The great alteration of the properties of the fat dyestuffs which is produced by the aforesaid union of two dyestuff molecules could not have been foreseen, and is nowhere described. As dyestuffs all those are suitable which are obtained by coupling tetrazotized diaminodiphenylmethane and diaminotriphenylmethane bases and their derivatives with amines, phenols, pyrazolones or their derivatives and other usual unsulphonated azo components, and which are soluble in fat oils. The diamino bases of the di- and tri-arylmethane series are easily obtained as shown in German patent specifications Nos. 71969 and 308785 or according to C 1908 (1) 1393.

It is advisable, especially if a dyestuff is not very easily soluble in fat oils, to produce same in the presence of Turkey red oil or other similarly acting substances.

The following examples will serve to explain the improved process.

Example 1

6.6 kg. of the diamino base from benzaldehyde and para-xylidine are tetrazotized as usual and combined with a solution of 5.8 kg. of β-naphthol in 1.6 kg. of caustic soda lye of 100 per cent strength and 10 kg. of sodium carbonate. The separated dyestuff is filtered off, washed neutral and dried. The red powder is soluble in concentrated sulphuric acid with a violet coloration.

The dyestuff has the following structural formula:

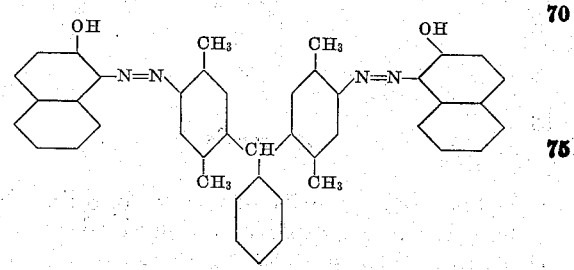

Example 2

6.4 kg. of the diamino base of 94.6 per cent strength from benzaldehyde and ortho-toluidine are converted into the diazo body and its solution is poured into 4.5 kg. of para-cresol in 1.6 kg. of caustic soda lye of 100 per cent strength, 10 kg. of sodium carbonate and 50 gr. of Turkey red oil. When the coupling is completed, the mass is filtered and the dyestuff isolated as above described. The fine yellow powder is soluble in concentrated sulphuric acid with a yellow brown coloration.

The dyestuff has the following structural formula:

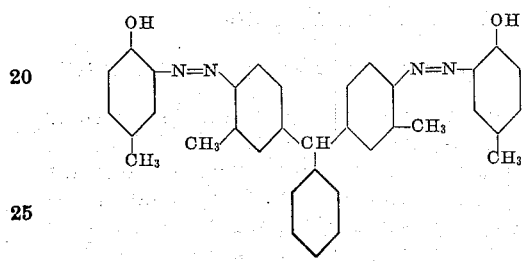

Example 3

5.5 kg. of the diamino base from ortho-chlorobenzaldehyde and para-xylidine are after tetrazotisation combined with 5.4 kg. of phenylmethylpyrazolone of 98 per cent strength dissolved in the necessary quantity of caustic soda lye and 8 kg. of sodium carbonate. The dyestuff isolated as usual is a dull yellow powder which gives a yellow solution in concentrated sulphuric acid.

The dyestuff has the following structural formula:

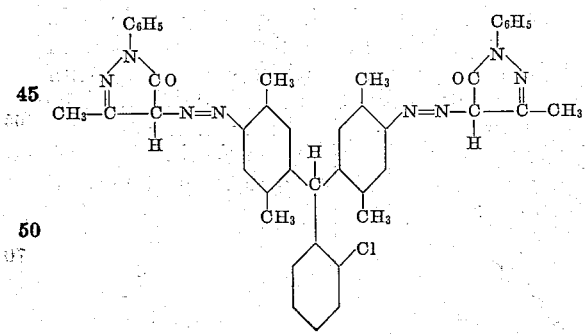

Example 4

The same quantity of tetrazotized diamino base as in Example 3 is combined in acid medium with a watery solution of 3.75 kg. of meta-toluylenediamine of 99 per cent strength, is rendered after a short time alkaline with respect to litmus paper by means of sodium carbonate and worked up. The orange colored powder dissolves in concentrated sulphuric acid with an orange-yellow coloration.

The dyestuff has the following structural formula:

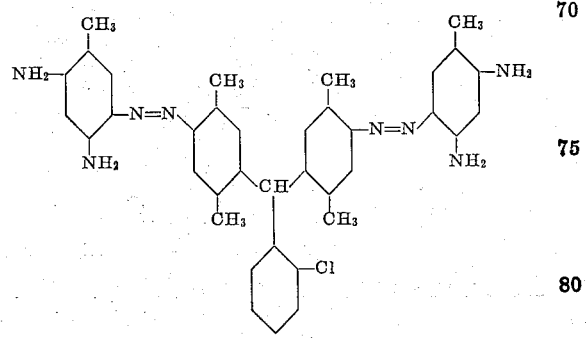

Example 5

3.43 kg. of the base from meta-toluidine and formaldehyde are tetrazotized as usual and coupled with 3.4 kg. of para-cresol, 1.2 kg. of caustic soda lye of 100 per cent strength and 8 kg. of sodium carbonate. After a short time the product is filtered off and washed neutral. The yellow dyestuff has good drying properties in linseed oil, but shows only a moderate yield in printing.

The dyestuff has the following structural formula:

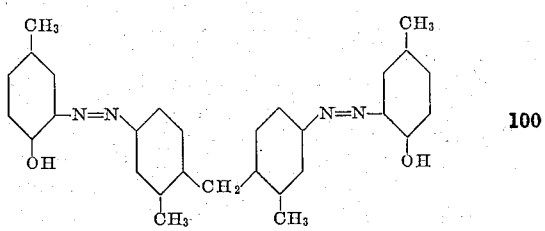

Example 6

The diazo solution of Example 5 is combined with 3.75 kg. of meta-toluylenediamine as in Example 4. An orange-yellow dyestuff is obtained with similar properties as in Example 5.

The dyestuff has the following structural formula:

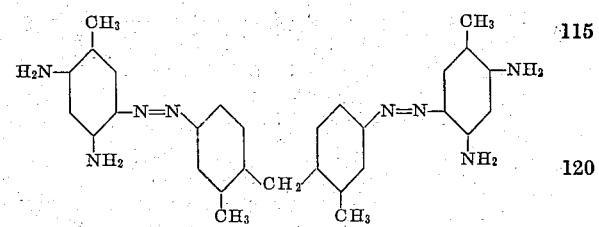

In the following table are given the properties of some dyestuffs obtained according to the improved process. There is a great range of alterations of the components which may be made on lines of this invention, both with respect to the aldehydes and to the bases and the coupling components.

| Diamino base from— | | Coupling component | Shade of the print | Drying properties |
|---|---|---|---|---|
| Aldehyde | Amine | | | |
| Benzaldehyde | Ortho-chloraniline | Para-cresol | Reddish yellow | Very good. |
| Benzaldehyde | Ortho-chloraniline | β-naphthol | Yellow, dull red | Good. |
| Benzaldehyde | Ortho-toluidine | Para-cresol | Dull yellow | Good. |
| Ortho-chlorobenzaldehyde | Ortho-toluidine | Para-cresol | Dull yellow | Good. |
| Benzaldehyde | Ortho-toluidine | β-naphthol | Bluish red | Very good. |
| Ortho-chlorobenzaldehyde | Ortho-toluidine | β-naphthol | Bluish red | Very good. |
| Ortho-chlorobenzaldehyde | Meta-toluidine | Para-cresol | Green-yellow | Very good. |
| Benzaldehyde | Meta-toluidine | Para-cresol | Green-yellow | Very good. |
| Benzaldehyde | Meta-toluidine | β-naphthol | Yellowish red | Very good. |
| Ortho-chlorobenzaldehyde | Meta-toluidine | β-naphthol | Yellowish red | Very good. |
| Ortho-chlorobenzaldehyde | Para-xylidine | Phenylmethyl-pyrazolone | Yellow | Good. |
| Ortho-chlorobenzaldehyde | Para-xylidine | 2.3-oxynaphthoic acid ethyl-ester | Bluish red | Very good. |
| Ortho-chlorobenzaldehyde | Para-xylidine | Meta-toluylene-diamine | Pure orange | Very good. |
| Ortho-chlorobenzaldehyde | Para-xylidine | 2.3-oxynaphthoic acid | Claret | Fairly good. |
| Ortho-chlorobenzaldehyde | Para-xylidine | Aceto-acetic ester | Yellowish brown | Very good. |
| Ortho-chlorobenzaldehyde | Para-xylidine | Para-cresol | Yellow | Very good. |
| Ortho-chlorobenzaldehyde | Para-xylidine | Resorcine | Fiery red brown | Very good. |
| Ortho-chlorobenzaldehyde | Para-xylidine | Cresidine | Orange-yellow | Fairly good. |
| Benzaldehyde | Para-xylidine | β-naphthol | Red | Very good. |
| Benzaldehyde | Para-xylidine | Para-cresol | Greenish yellow | Very good. |
| Ortho-chlorobenzaldehyde | Para-xylidine | Naphthol AS | Carmine | Very good. |
| Ortho-chlorobenzaldehyde | Para-xylidine | β-naphthol | Red | Very good. |
| Meta-chlorobenzaldehyde | Para-xylidine | β-naphthol | Red | Very good. |
| Para-chlorobenzaldehyde | Para-xylidine | β-naphthol | Fawn-red | Good. |
| Formaldehyde | Meta-toluidine | Para-cresol | Reddish yellow | Good. |
| Formaldehyde | Meta-toluidine | Meta-toluylene-diamine | Orange | Good. |

What we claim is:—

1. As new articles of manufacture, the herein described oil and fat soluble azo-dyestuffs for print works, obtained by coupling a tetrazotized diamino base from a benzaldehyde and para-xylidine with unsulphonated azo components, said azo-dyestuffs being very easily soluble in linseed oil and having in oil solution the properties of well and rapidly drying up and not blotting.

2. As new articles of manufacture, the herein described oil and fat soluble azo-dyestuffs for print works, obtained by coupling a tetrazotized diamino base from a halogen substituted benzaldehyde and para-xylidine with unsulphonated azo components, said azo-dystuffs being very easily soluble in linseed oil and having in oil solution the properties of well and rapidly drying up and not blotting.

3. As new articles of manufacture, the herein described oil and fat soluble azo-dyestuffs for print works, obtained by coupling a tetrazotized diamino base from an aldehyde and a primary amine of the benzene series with unsulphonated azo components, said azo-dyestuffs being very easily soluble in linseed oil and having in oil solution the properties of well and rapidly drying up and not blotting.

4. As new articles of manufacture, the herein described oil and fat soluble azo-dyestuffs for print works, obtained by coupling a tetrazotized diamino base from an aldehyde and para-xylidine with unsulphonated azo components, said azo-dyestuffs being very easily soluble in linseed oil and having in oil solution the properties of well and rapidly drying up and not blotting.

5. As new articles of manufacture, the herein described oil and fat soluble azo-dyestuffs for print works, obtained by coupling a tetrazotized diamino base from formaldehyde and meta-toluidine with unsulphonated azo components, said azo-dyestuffs being very easily soluble in linseed oil and having in oil solution the properties of well and rapidly drying up and not blotting.

In witness whereof we have hereunto signed our names this 12th day of November, 1928.

ADOLF KREBSER.
ERNST WYSARD.